(12) United States Patent
Liu

(10) Patent No.: US 12,212,514 B2
(45) Date of Patent: Jan. 28, 2025

(54) CONTROL RESOURCE CONFIGURATION METHOD AND APPARATUS, CONTROL RESOURCE DETERMINATION METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 383 days.

(21) Appl. No.: 17/597,141

(22) PCT Filed: Jun. 28, 2019

(86) PCT No.: PCT/CN2019/093922
§ 371 (c)(1),
(2) Date: Dec. 27, 2021

(87) PCT Pub. No.: WO2020/258335
PCT Pub. Date: Dec. 30, 2020

(65) Prior Publication Data
US 2022/0321290 A1    Oct. 6, 2022

(51) Int. Cl.
*H04L 5/00* (2006.01)
*H04W 72/0453* (2023.01)

(52) U.S. Cl.
CPC ....... *H04L 5/0048* (2013.01); *H04W 72/0453* (2013.01)

(58) Field of Classification Search
CPC .... H04L 5/0048; H04L 5/0053; H04W 56/00; H04W 72/0453; H04W 72/53
See application file for complete search history.

(56) References Cited

U.S. PATENT DOCUMENTS

| | | | |
|---|---|---|---|
| 10,200,872 B2* | 2/2019 | Sakhnini | H04L 5/0044 |
| 10,523,476 B2* | 12/2019 | Sun | H04L 27/2613 |
| 10,601,627 B2* | 3/2020 | Yi | H04W 4/70 |
| 10,798,706 B1* | 10/2020 | Raghunathan | H04W 56/002 |
| 10,813,014 B2* | 10/2020 | Åström | H04L 27/2656 |
| 10,869,285 B2* | 12/2020 | Harada | H04L 27/26 |
| 11,224,029 B2* | 1/2022 | Rune | H04W 68/005 |
| 11,324,076 B2* | 5/2022 | Xiong | H04L 5/1469 |
| 11,997,701 B2* | 5/2024 | Takahashi | H04L 5/0053 |
| 2018/0198648 A1* | 7/2018 | Sun | H04L 5/0094 |

(Continued)

FOREIGN PATENT DOCUMENTS

| | | | | |
|---|---|---|---|---|
| BR | 112021005977 A2 * | 6/2021 | | H04L 5/0053 |
| CA | 3114564 A1 * | 4/2020 | | H04L 5/0053 |

(Continued)

OTHER PUBLICATIONS

"Remaining issues on SS block and SS burst set composition," Proceedings of the 3GPP TSG RAN WG1 NR Ad-Hoc#3, R1-1715606, Sep. 18, 2017, Nagoya, Japan, 5 pages.

(Continued)

*Primary Examiner* — Eric Nowlin
(74) *Attorney, Agent, or Firm* — McCoy Russell LLP

(57) ABSTRACT

A control resource configuration method includes: configuring resources of a control resource set according to an (Continued)

allocation object of a Synchronization Signal and PBCH block (SSB).

15 Claims, 4 Drawing Sheets

(56) References Cited

U.S. PATENT DOCUMENTS

| | | | |
|---|---|---|---|
| 2019/0036756 A1* | 1/2019 | Yi | H04W 48/16 |
| 2019/0132170 A1* | 5/2019 | Si | H04W 48/12 |
| 2019/0141587 A1* | 5/2019 | Åström | H04L 27/2655 |
| 2019/0173628 A1* | 6/2019 | Ko | H04W 72/0453 |
| 2019/0191401 A1* | 6/2019 | Harada | H04W 56/00 |
| 2019/0280843 A1* | 9/2019 | Jeon | H04L 5/001 |
| 2020/0068512 A1* | 2/2020 | Xue | H04L 27/2657 |
| 2020/0146107 A1* | 5/2020 | Xiong | H04W 72/23 |
| 2020/0252907 A1* | 8/2020 | Rune | H04W 8/24 |
| 2020/0267697 A1* | 8/2020 | Liu | H04W 56/001 |
| 2020/0367288 A1* | 11/2020 | Dahlman | H04W 74/0833 |
| 2021/0377950 A1* | 12/2021 | Takahashi | H04W 56/001 |
| 2023/0115192 A1* | 4/2023 | Nemeth | H04L 27/26025 370/329 |

FOREIGN PATENT DOCUMENTS

| | | | | |
|---|---|---|---|---|
| CN | 102958133 A | | 3/2013 | |
| CN | 108282317 A | | 7/2018 | |
| CN | 108521857 A | | 9/2018 | |
| CN | 109787730 A | | 5/2019 | |
| CN | 109891819 A | | 6/2019 | |
| CN | 112753261 A | * | 5/2021 | H04L 5/0053 |
| CN | 112753261 B | * | 5/2024 | H04L 5/0053 |
| EP | 3860247 A1 | * | 8/2021 | H04L 5/0053 |
| WO | 2017123326 A1 | | 7/2017 | |

OTHER PUBLICATIONS

"Remaining issues for SSB design," Proceedings of the 3GPP TSG RAN WG1 Meeting #90bis, R1-1717459, Oct. 9, 2017, Prague, Czech Republic, 6 pages.

* cited by examiner configuring resources of a control resource set according to an allocation object of a Synchronization Signal and PBCH block (SSB) — S110

CONTROL RESOURCE CONFIGURATION METHOD AND APPARATUS, CONTROL RESOURCE DETERMINATION METHOD AND APPARATUS, COMMUNICATION DEVICE, AND STORAGE MEDIUM

CROSS REFERENCE TO RELATED APPLICATION

The present application is a U.S. National Phase of International Application No. PCT/CN2019/093922 entitled "CONTROL RESOURCE CONFIGURATION METHOD AND APPARATUS, CONTROL RESOURCE DETERMINATION METHOD AND APPARATUS, COMMUNICATION DEVICE, AND STORAGE MEDIUM," and filed on Jun. 28, 2019. The entire contents of the above-listed application is hereby incorporated by reference for all purposes.

TECHNICAL FIELD

The present application relates to the field of the wireless communication technology, but is not limited to the wireless communication technology, and particularly relates to a control resource configuration method and apparatus, a control resource determination method and apparatus, a communication device, and a storage medium.

BACKGROUND AND SUMMARY

Currently, narrow band User Equipment (UE) is introduced into a 5th Generation (5G) mobile communication network, but communication of the narrow band UE cannot be well supported. The narrow band UE is narrower in bandwidth with respect to UE with the minimum bandwidth in a first version of 5G system, has lower power consumption, and is applied to a scene which does not require a too large data volume in the 5G system. The bandwidth which can be processed by the narrow band UE is smaller than the bandwidth which can be processed by non-narrow band UE. However, in the related art, it still needs to further solve the problem how to utilize the system to implement compatibility to communication of the narrow band UE and the non-narrow band UE, or reduce resource waste of communication of UE with different bandwidths.

According to a first aspect of the examples of the present application, provided is a resource configuration method, including: configuring resources of a control resource set according to an allocation object of a Synchronization Signal Block (SSB).

According to a second aspect of the examples of the present application, provided is a resource determination method, including: receiving an SSB; and determining resources of a control resource set according to an allocation object of the SSB.

According to a third aspect of the examples of the present application, provided is a communication device, comprising: a transceiver, a memory, a processor and a computer program stored on the memory and executed by the processor, wherein the processor is respectively connected with the transceiver and the memory and configured to execute the implement the computer program to configure resources of a control resource set according to an allocation object of a Synchronization Signal Block (SSB).

According to a fourth aspect of the examples of the present application, provided is a communication device, comprising: a transceiver, a memory, a processor and a computer program stored on the memory and executed by the processor, wherein the processor is respectively connected with the transceiver and the memory and configured to execute the implement the computer program to receive a Synchronization Signal Block (SSB), and determine resources of a control resource set according to an allocation object of the SSB.

According to a fifth aspect of the examples of the present application, provided is a non-transitory computer storage medium, storing a computer program, wherein after the computer program is executed, the resource configuration method provided by the first aspect of the examples of the present application is implemented.

According to a sixth aspect of the examples of the present application, provided is a non-transitory computer storage medium, storing a computer program, wherein after the computer program is executed, the resource determination method provided by the second aspect of the examples of the present application is implemented.

DETAILED DESCRIPTION

Figures 1, 2:
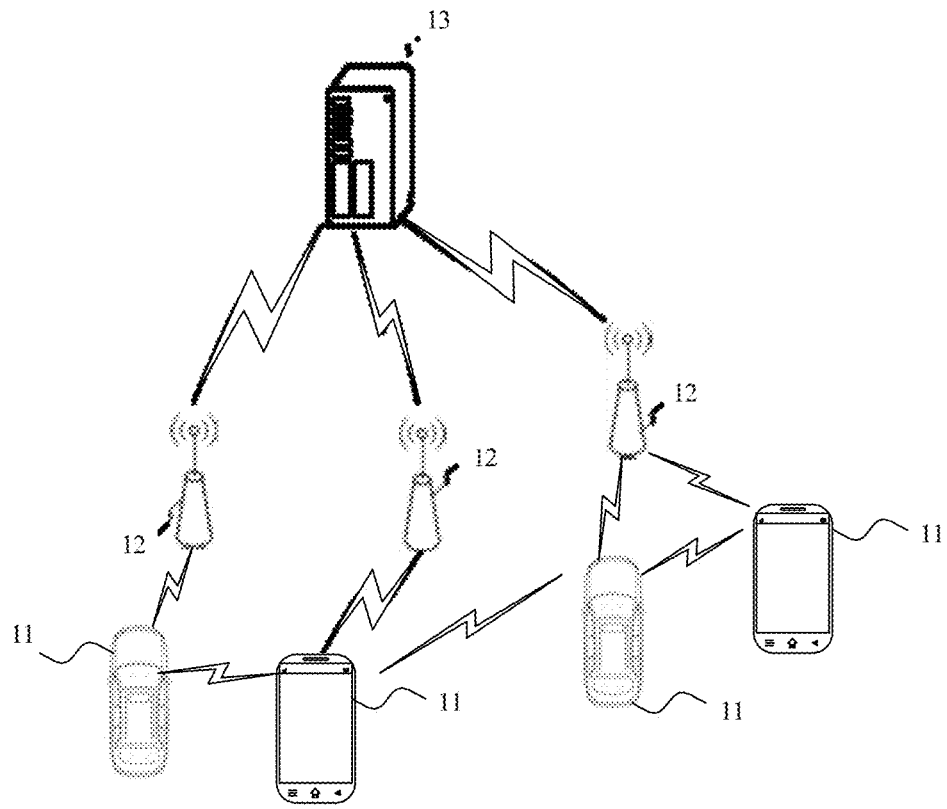
FIG. 1 is a structural schematic diagram of a wireless communication system provided by an example of the present application.
FIG. 2 is a flow schematic diagram of a resource configuration method provided by an example of the present application.

Some examples will be illustrated in detail herein, and the examples thereof are expressed in the drawings. When description below is related to the drawings, unless otherwise expressed, the same number in different drawings represent the same or similar elements. The implementation modes described in the following examples do not represent all implementation modes consistent with examples of the present application. On the contrary, they are merely examples of apparatuses and methods consistent with some aspects of the examples of the present application.

Terms used in the examples of the present disclosure merely aim to describe specific examples, but are not intended to limit the examples of the present disclosure. Singular forms such as "a" and "the" used in the examples of the present disclosure are also intended to include plural forms, unless other meanings are clearly expressed in the context. It still should be understood that the term "and/or" used in this article means and includes any or all possible combinations of one or more associated listed items.

It should be understood that in the examples of the present disclosure, terms such as "first", "second", "third" and the like may be adopted to describe various information, but the information should not be limited to these terms. These terms are merely used for distinguishing the same type of information. For example, without departure from the scope of the examples of the present disclosure, first information also may be called as second information, and similarly, second information also may be called as first information. It depends on the language environment, and for example, words such as "if" used herein may be explained as "during" or "when" or "in response to determination".

With reference to FIG. 1, it shows a structural schematic diagram of a wireless communication system provided by an example of the present disclosure. As shown in FIG. 1, the wireless communication system is a communication system based on a cellular mobile communication technology, and the wireless communication system may include: a plurality of terminals 11 and a plurality of base stations 12.

The terminal 11 may refer to a device for providing voice and/or data connectivity to a user. The terminal 11 may communicate with one or more core networks via a Radio Access Network (RAN), the terminal 11 may be an Internet of Things (IoT) terminal, such as a sensor device, a mobile phone (or called as a "cellular" phone) and a computer with an IoT terminal, and for example, the terminal may be a fixed, portable, pocket, handheld, computer built-in or vehicle-mounted apparatus. For example, the terminal may be a Station (STA), a subscriber unit, a subscriber station, a mobile station, a mobile, a remote station, an access point, a remote terminal, an access terminal, a user terminal, a user agent, a user device, or User Equipment (UE). Or, the terminal also may be an unmanned aerial vehicle device. Or, the terminal also may be a vehicle-mounted device, and for example, may be a trip computer with the wireless communication function, or a wireless communication device externally connected with the trip computer. Or, the terminal 11 also may be a road-side unit, and for example, may be a street lamp, a signal lamp or other road-side units with the wireless communication function.

The base station 12 may be a network-side device in a wireless communication system. The wireless communication system may be a 5G system also known as a new radio (NR) system or a 5G NR system. Or, the wireless communication system also may be a next-generation system of the 5G system in which an access network may be called as a New Generation-Radio Access Network (NG-RAN).

The base station 12 may be a base station (gNB) adopting a central distributed architecture in the 5G system. When the base station 12 adopts the central distributed architecture, the base station generally includes a central unit (CU) and at least two distributed units (DUs). Protocol stacks of a Packet Data Convergence Protocol (PDCP) layer, a Radio Link Control (RLC) layer and a Media Access Control (MAC) layer are arranged in the central unit; and a protocol stack of a Physical (PHY) layer is arranged in the distributed unit. The examples of the present disclosure do not make any limit to the specific implementation mode of the base station 12.

A wireless connection can be established between the base station 12 and the terminal 11 through a radio air interface. In different implementation modes, the radio air interface is based on the 5G mobile communication network technology standard, and for example, the radio air interface is new radio; or, the radio air interface also may be based on a next-generation mobile communication network technology standard of the 5G.

In some examples, an End to End (E2E) connection also may be established between the terminals 11. In some examples, the wireless communication system also may include a network management device 13.

A plurality of base stations 12 are respectively connected with the network management device 13. The network management device 13 may be a core network device in the wireless communication system, and for example, the network management device 13 may be a Mobility Management Entity (MME) in an Evolved Packet Core (EPC). Or, the network management device also may be other core network devices, e.g., a Serving GateWay (SGW), a Public Data Network GateWay (PGW), a Policy and Charging Rules Function (PCRF) or a Home Subscriber Server (HSS) and the like. For the implementation form of the network management device 13, the examples of the present disclosure do not make any limit.

As shown in FIG. 2, the example provides a resource configuration method, including:

step S110: configuring resources of a control resource set according to an allocation object of an SSB.

The resource configuration method provided by this example is applied in a base station. A system of the base station can configure the resources of the control resource set according to the allocation object of the SSB.

The allocation object is different types of UE. For example, the allocation object at least can be divided into: a first type of UE and a second type of UE; and a bandwidth supported by the first type of UE may be smaller than that supported by the second type of UE.

For example, the first type of UE may be called as narrow band UE; and the second type of UE may be non-narrow band UE.

The bandwidth supported by the narrow band UE is relatively fixed. In a 5G mobile communication network system, the definition of the narrow band may be that a bandwidth of a low frequency band below 7 GHz is lower than 10 MHz, and a bandwidth of a high frequency band over 28 GHz is lower than 140 MHz; and the bandwidth supported by the narrow band UE is generally lower than initial access bandwidths of R15 and R16 version 5G mobile communication networks. Therefore, the narrow band UE cannot access the R15 and R16 version 5G mobile communication networks.

In order to implement communication compatibility of the first type of UE and the second type of UE which are different and meanwhile, promote the effective utilization rate of the resources to the greatest extent, the SSB is not uniformly configured without distinguishing UE types any more, but the UE types are distinguished to configure the SSB to the first type of UE or the second type of UE.

For example, the SSB configured to the first type of UE can be used for synchronization between the first type of UE and the base station. The SSB configured to the second type of UE can be used for synchronization between the second type of UE and the base station.

The SSB is a resource block for transmitting a synchronization signal.

In some examples, the allocation objects of the SSBs are different, and then bandwidths of the SSBs are different; or, the allocation objects of the SSBs are different, then indication information of the SSBs is different.

In this example, the allocation objects of the SSBs are different, then the resource configurations of the control resource sets corresponding to the SSBs also may be different. So, in this example, the resources of the control resource set may be configured according to the allocation object of the SSB; and for example, it includes, but is not limited to: the bandwidth of the control resource set is configured.

The control resource set includes, but is not limited to: a control resource set (CORESET #0) of a Physical Downlink Control Channel (PDCCH) #0. The control resource set includes one or more resources. The bandwidth of the control resource set herein is a bandwidth of the single resource in the control resource set.

The control resource set may be used for transmitting various control data for subsequent operations of the UE. For example, the resources in the CORESET #0 may be used for transmitting Remained Minimum System Information (RMSI). After receiving the RMSI, the UE can randomly access the base station according to the RMSI, or the UE sets a paging timer and the like.

In this example, the SSB may be configured to different types of UE, and thus, configuration of the control resource set is carried out according to the allocation object of the SSB and the resources in the control resource set can be adaptively configured, so that in one aspect, the receiving failure caused by a case that the narrow band UE cannot support a large bandwidth is reduced, and in the other aspect, the resource waste phenomenon caused by configuration of a large-bandwidth control resource set to the narrow band UE can be reduced.

In some examples, the bandwidth of the SSB is 20 Physical Resource Blocks (PRBs).

In this example, the bandwidths of the SSBs with different allocation objects are all 20 PRBs, so that the SSB can be well compatible to the related art.

In some examples, the allocation object of the SSB is indicated by utilizing a predetermined field in a Physical Broadcast Channel (PBCH) message. The predetermined field may be newly added in the PBCH message for indicating the allocation object of the SSB.

In some another examples, the allocation object of the SSB is indicated by utilizing an existing field in the PBCH message, and for example, the allocation object of the SSB is indicated by utilizing a reserved bit of the existing field in the PBCH message. The reserved bit is a bit value of an unused bit sequence, so that in one aspect, it can be well compatible to the related art, and in the other aspect, indication of different field contents also can be completed by utilizing the PBCH message.

Figure 3:
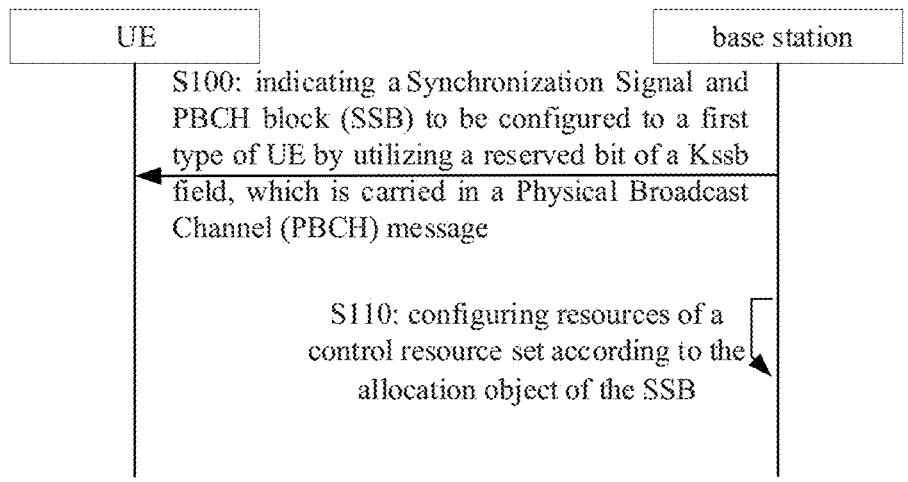
FIG. 3 is a flow schematic diagram of another resource configuration method provided by an example of the present application.

In some examples, as shown in FIG. 3, the method further includes:

step S100: indicating the SSB to be configured to the first type of UE by utilizing a reserved bit of a Kssb field, which is carried in a PBCH message.

The Kssb field may include four bits, four bits have 16 values in total, part of the values have been used for indicating other information, and for example, other information may be: an offset quantity of Resource Elements (REs) between the control resource set and the SSB and the like. The used values are used bits of the Kssb field. In the four bits corresponding to the Kssb field, a value unused for indicating other information is the reserved bit.

When the reserved bit of the Kssb field is carried in the PBCH message, the SSB is indicated to be configured to the first type of UE.

When the used bit of the Kssb field is carried in the PBCH message, the SSB is indicated to be configured to the second type of UE.

Meanwhile, when the SSB is configured to the second type of UE, the used bit of the Kssb field is also used for indicating the offset quantity of Resource Element (RE) levels between the resource of the control resource set and the SSB configured to the second type of UE.

After the UE accesses a cell, the PBCH message can be received on a PBCH resource, after the PBCH message is received, it can be known which type of UE the legacy SSB is configured to, and if the SSB is configured to the current UE, the SSB needs to be intercepted, and the resource of the control resource set is determined based on the SSB. If the SSB is not configured to the current UE, the corresponding SSB does not need to be intercepted, so that in one aspect, power consumption of a terminal can be reduced, and meanwhile, the UE can be distinguished and optimal configuration of the resources can be implemented.

In some examples, if the SSB is configured to the first type of UE, resource configuration information of the control resource set includes: an offset which is used for indicating an offset quantity of RE levels between a frequency domain resource in the control resource set and the SSB.

The resource configuration information may be written into the terminal in advance, or may be regularly issued by the base station.

In some examples, the first type of UE and the second type of UE are different in resources of the control resource set, and then there may be different resource configuration information of the control resource set.

For example, the resource configuration information of the control resource set of the first type of UE not only may include a resource configuration indication at a Resource Block (RB) level of the control resource set, but also may include the offset. The offset indicates that the offset of RE levels between the resource in the control resource set and the SSB in the frequency domain, so that after an RB where the control resource set is positioned is determined and a frequency domain position of the control resource set on the RB is determined according to the offset, it starts to receive control information such as the RMSI and the like from the corresponding RB after the offset.

In some examples, when the SSB is configured to the first type of UE, a bandwidth of the control resource set is 20 PRBs.

Therefore, if the SSB is configured to the first type of UE, the bandwidth of the control resource set and the bandwidth of the SSB are the same, and are both 20 PRBs. Therefore, the bandwidth of the control resource set does not need to be equal to 24, 48 or 96 PRBs and the like, so that unnecessary bandwidth waste is reduced; and the effective utilization rate of the frequency domain resource is improved.

In some examples, when the SSB is configured to the first type of UE, the bandwidth of the control resource set is smaller than 20 PRBs.

In some examples, the first type of UE may support 20 PRBs or may receive information on a smaller bandwidth, e.g., a bandwidth which is smaller than 20 PRBs, so that in order to ensure the receiving quality of the information transmitted on the resource in the control resource set, a bandwidth of the frequency domain resource of the control resource set will be further reduced.

For example, the bandwidth of the control resource set may be 16 to 19 PRBs. Specifically, for example, the bandwidth of the control resource set may be 18 PRBs. 18 PRBs may be a transmission bandwidth for the RMSI, which is required by the first type of UE, so that unnecessary bandwidth waste can be further reduced.

In some examples, in order to further promote the effective utilization of the resource, the bandwidth of the SSB may be changed. For example, the bandwidth of the SSB configured to the first type of UE is smaller than 20 PRBs.

For example, the bandwidth of the SSB configured to the first type of UE is a random number of PRBs from 16 to 19.

In some examples, the SSB of which the bandwidth is smaller than 20 PRBs has more time domain resources than the SSB of which the bandwidth is equal to 20 PRBs.

For example, when the bandwidth of the SSB is 16 PRBs, a time domain symbolic number of the SSB is one more than that of the SSB of which the bandwidth is equal to 20 PRBs.

For example, the bandwidth of the SSB configured to the first type of UE may be 18 PRBs.

At the moment, the bandwidth of the SSB configured to the second type of UE is kept being equal to 20 PRBs. As such, the second type of UE can know whether the legacy SSB is configured to itself according to the bandwidth of the SSB; if the legacy SSB is configured to the second type of UE, the second type of UE carries out synchronization with the base station according to the synchronization signal transmitted by the SSB; or the second type of UE does not carry out synchronization with the base station.

For example, when the bandwidth of the SSB is 20 PRBs, the first type of UE does not synchronize with the base station based on the synchronization signal on the bandwidth of 20 PRBs, but the second type of UE will carry out synchronization based on the synchronization signal transmitted on the bandwidth of 20 PRBs.

For another example, when the bandwidth of the SSB is smaller than 20 PRBs, the second type of UE does not synchronize with the base station based on the synchronization signal on the bandwidth which is smaller than 20 PRBs, but the first type of UE will carry out synchronization based on the synchronization signal transmitted on the bandwidth which is smaller than 20 PRBs.

In some examples, a frequency domain sync raster of the SSB of which the bandwidth is smaller than 20 PRBs is different from that of the SSB of which the bandwidth is 20 PRBs.

One frequency domain sync raster corresponds to the bandwidth of one frequency domain, and the greater the frequency domain sync raster is, the greater the bandwidth is. When the SSB is configured, the first type of UE and the second type of UE are distinguished, so the SSB configured to the second type of UE may be kept having the bandwidth of 20 PRBs, and the bandwidth of the first type of UE may be smaller than 20 PRB. Therefore, the base station can carry out SSB configuration to different types of UE based on different frequency domain sync rasters.

In some examples, at least two resources included by the control resource set are the same frequency domain resources adopting Time Division Multiplexing (TDM).

In some cases, the bandwidth of the control resource set configured to the first type of UE is reduced, but if control information cannot be completely transmitted, a plurality of time domain resources with the same bandwidth will be configured in a TDM mode, so the control information such as the RMSI and the like is transmitted by utilizing different time domain resources together.

In some examples, the bandwidth in the control resource set is reduced, and then the number of the time domain resources in the control resource set may be increased in a TDM mode. For example, after the bandwidth of the control resource set is reduced to 18 PRBs, the time domain resources in the control resource set is at least increased by one transmission symbol, or increased by the maximum value of the number of the included time domain resources. For example, when the original number of the time domain resources included by the control resource set is a random number from 1 to 3 and the bandwidth of the control resource set is 18 PRBs, the number of the time domain resources included by the control resource set may be 1 to 4.

In some example, the step S110 includes: configuring the bandwidth resource of the control resource set according to the bandwidth of the SSB transmitting a Primary Synchronization Signal (PSS) or a Secondary Synchronization Signal (SSS), the bandwidth of the SSB transmitting the PSS being the same with that of the SSB transmitting the SSS. For example, in some examples, the bandwidth of the SSB transmitting the PSS and the bandwidth of the SSB transmitting the SSS are both 12 PRBs.

The SSB may be used for transmitting the PSS or the SSS. In this example, when configuration of the control resource set is carried out, bandwidth configuration of the control resource set is carried out according to the bandwidth of the SSB transmitting the PSS or the bandwidth of the SSB transmitting the SSS.

Figure 4:
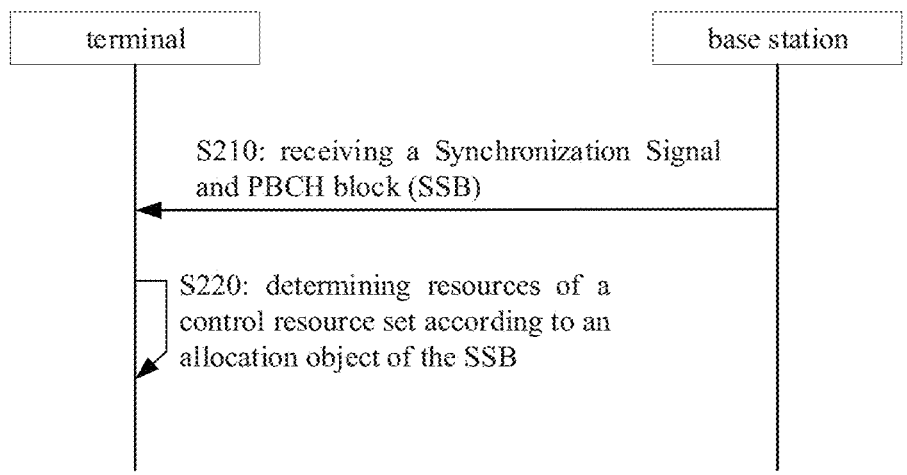
FIG. 4 is a flow schematic diagram of a resource determination method provided by an example of the present application.

As shown in FIG. 4, the example provides a resource determination method, including:

step S210: receiving an SSB; and step S220: determining resources of a control resource set according to an allocation object of the SSB.

In this example, UE may detect the SSB to determine which type of UE the legacy SSB is configured to. For example, the UE knows a bandwidth of the SSB configured to itself or indication content of the SSB configured to itself in advance. After UE receives the SSB configured to itself, the resources of the control resource set will be determined according to the SSB.

The allocation object includes, but is not limited to: a first type of UE and a second type of UE, and a bandwidth supported by the first type of UE is smaller than that supported by the second type of UE.

Bandwidths of the SSBs configured to the first type of UE and the second type of UE may be both 20 PRBs.

When the bandwidths of the SSBs configured to the first type of UE and the second type of UE are both 20 PRBs, the allocation object of the SSB is indicated by a predetermined field in a PBCH message.

For example, the method further includes: receiving the PBCH message; and, when a reserved bit of a Kssb field is carried in the PBCH message, determining that the allocation object of the SSB is the first type of UE.

For another example, the method further includes: when a used bit of the Kssb field is carried in the PBCH message, determining that the allocation object of the SSB is the second type of UE.

As such, the UE can know the allocation object of the SSB. After the allocation object is known, if the SSB is configured to the corresponding type of UE, the corresponding type of UE needs to synchronize with a base station according to a synchronization signal received from the SSB, and receive control information such as RMSI and the like based on the resources of the control resource set corresponding to the SSB.

In some examples, the step S220 may include: when the allocation object of the SSB is the first type of UE, determining a frequency domain resource at a Resource Block (RB) level of the control resources according to resource indication information in configuration information of the control resource set of the first type of UE.

For example, the resource indication information includes, but is not limited to: information such as an index of the RB and the like. For example, Table 1 is a configuration table of the control resource set of the first type of UE.

TABLE 1

| Index | SS/PBCH block and CORESET multiplexing pattern | Number of RBs $N_{RB}^{CORESET}$ | Number of Symbols $N_{symb}^{CORESET}$ | Offset (Kssb field) |
|---|---|---|---|---|
| 0 | 1 | 24 | 2 | 0 |
| 1 | 1 | 24 | 2 | 1 |
| 2 | 1 | 24 | 2 | 2 |
| 3 | 1 | 24 | 2 | 3 |
| 4 | 1 | 24 | 2 | 4 |
| 5 | 1 | 24 | 2 | 5 |
| 6 | 1 | 24 | 2 | 6 |
| 7 | 1 | 24 | 2 | 7 |
| 8 | 1 | 24 | 2 | 8 |
| 9 | 1 | 24 | 2 | 9 |
| 10 | 1 | 24 | 2 | 10 |
| 11 | 1 | 24 | 2 | 11 |
| 12 | 1 | 24 | 3 | 0 |
| 13 | 1 | 24 | 3 | 3 |
| 14 | 1 | 24 | 3 | 7 |
| 15 | 1 | 24 | 3 | 11 |

The resource indication information includes, but is not limited to: the index, the multiplexing pattern, the number of RBs in the control resource set, and the number of symbols in the control resource set.

In the examples of the present application, the RB level is a PRB level; and the RB may be the abbreviation of the PRB.

In some examples, the method further includes: determining an offset quantity of RE levels between the SSB and the frequency domain resource in the control resource set according to an offset in the configuration information of the control resource set of the first type of UE.

The offset can refer to Table 1.

In Table 1, the bandwidth of the control resource set is smaller than 24 PRBs. However, in some examples, the bandwidth of the control resource set may be 20 PRBs.

In some examples, the bandwidth of the control resource set is equal to 20 PRBs, and for example, the bandwidth can refer to Table 2.

TABLE 2

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 20 | 3 | 0 |

At the moment, the bandwidth of the control resource set is smaller than 20 PRBs. The bandwidths of the SSB and the control resource set are the same, and then there is no offset of RE levels between the SSB and the control resource set. Thus, in Table 2, the offset of RE levels between the SSB and the control resource set is 0.

When the bandwidth of the control resource set is smaller than 20 PRBs, the bandwidth of the control resource set may be: 16 to 19 PRBs.

For example, the bandwidth of the control resource set is 18 PRBs.

In some examples, the step S220 may include: when the bandwidth of the SSB is smaller than 20 PRBs, determining the resources of the control resource set according to the configuration information of the control resource set of the first type of UE.

At the moment, according to the bandwidth of the SSB, which is smaller than 20 PRBs, the first type of UE regards that the SSB is configured to itself, and then the resources of the control resource set can be determined according to the configuration information of the control resource set of the first type of UE.

Table 3 is a configuration table of the control resource set configured to the first type of UE when the bandwidth of the SSB is smaller than 20 PRBs.

TABLE 3

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | X | Y | 0 |
| 1 | 1 | X | Y + K | 0 |
| 2 | Reserved | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |
| 15 | | | | |

The offset of RB levels between the control resource set configured to the first type of UE and the SSB is 0. At the moment, the resources at the RB level are determined, the first type of UE also can determine the offset of RE levels between the resources of the control resource set and the SSB according to the used bit of the Kssb field in the PBCH.

In some examples, when the bandwidth of the SSB configured to the first type of UE is smaller than 20 PRBs, the bandwidth of the control resource set configured to the first type of UE may be the same with that of the SSB, so that the offset quantity of RE levels between the SSB configured to the first type of UE and the control resource set is 0.

Figure 5:
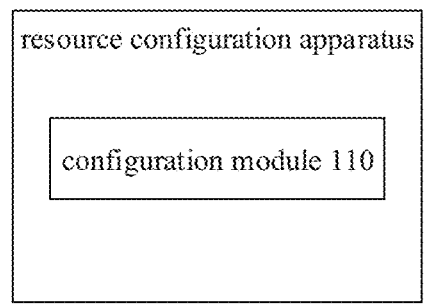
FIG. 5 is a structural schematic diagram of a resource configuration apparatus provided by an example of the present application.

As shown in FIG. 5, the example provides a resource configuration apparatus, including: a configuration module 110, configured to configure resources of a control resource set according to an allocation object of an SSB.

In some examples, the configuration module 110 may be a program module, and the program module can configure the resources of the control resource set based on the allocation object of the SSB after being executed by a processor.

In some another examples, the configuration module 110 may be a software and hardware combined module, and the software and hardware combined module may be various programmable arrays, e.g., a Field Programmable Gate Array (FPGA) and a complex programmable array.

In some yet another examples, the configuration module 110 may be a pure hardware module, and the pure hardware module includes, but is not limited to an application-specific integrated circuit.

In some examples, the resource configuration apparatus further includes: a storage module. The storage module is configured to store resource configuration information of the control resource set.

In some examples, bandwidths of the SSBs configured to a first type of UE and a second type of UE are 20 PRBs.

In some examples, the apparatus further includes: an indication module, configured to indicate the SSB to be configured to the first type of UE by utilizing a reserved bit of a Kssb field, which is carried in a PBCH message.

In some examples, the resource configuration information of the control resource set of the first type of UE includes: an offset which is used for indicating an offset quantity of RE levels between a frequency domain resource in the control resource set and the SSB.

In some examples, when the SSB is configured to the first type of UE, a bandwidth of the control resource set is 20 PRBs.

In some examples, when the SSB is configured to the first type of UE, the bandwidth of the control resource set is smaller than 20 PRBs.

In some examples, the bandwidth of the control resource set of which the bandwidth is smaller than 20 PRBs may be 16 to 19 PRBs.

In some examples, the SSB of which the bandwidth is smaller than 20 PRBs has more time domain resources than the SSB of which the bandwidth is equal to 20 PRBs. For example, when the bandwidth of the SSB is 16 PRBs, a time domain symbolic number of the SSB is one more than that of the SSB of which the bandwidth is equal to 20 PRBs.

In some examples, when the SSB is configured to the first type of UE, the bandwidth of the control resource set is 18 PRBs.

In some examples, the bandwidth of the SSB configured to the first type of UE is smaller than a bandwidth of 20 PRBs.

In some examples, the bandwidth of the SSB configured to the first type of UE is a bandwidth of 18 PRBs.

In some examples, at least two resources included by the control resource set are the same frequency domain resources adopting TDM.

In some examples, configuring the resources of the control resource set according to the allocation object of the SSB includes: configuring the bandwidth of the control resource set according to the bandwidth of the SSB transmitting a PSS or an SSS, the bandwidth of the SSB transmitting the PSS being the same with that of the SSB transmitting the SSS.

Figure 6:
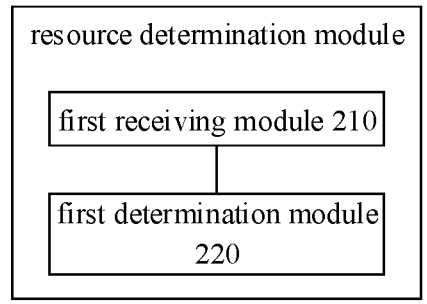
FIG. 6 is a structural schematic diagram of a resource determination apparatus provided by an example of the present application.

As shown in FIG. 6, the example provides a resource determination apparatus, including:

a first receiving module 210, configured to receive an SSB; and a first determination module 220, configured to determine resources of a control resource set according to an allocation object of the SSB.

In some examples, bandwidths of the SSBs configured to a first type of UE and a second type of UE are both 20 PRBs.

In some examples, the allocation object includes, but is not limited to: the first type of UE and a second type of UE, and a bandwidth supported by the first type of UE is smaller than that supported by the second type of UE.

In some examples, the apparatus further includes:

a second receiving module, configured to receive a PBCH message; and a second determination module, configured to, when a reserved bit of a Kssb field is carried in the PBCH message, determine that the allocation object of the SSB is the first type of UE.

In some examples, the first determination module 220 is configured to: when the allocation object of the SSB is the first type of UE, determine a frequency domain resource at an RB level of the control resources according to resource indication information in configuration information of the control resource set of the first type of UE.

In some examples, the apparatus further includes: a third determination module, configured to determine an offset quantity of RE levels between the SSB and the frequency domain resource in the control resource set according to an offset in the configuration information of the control resource set of the first type of UE.

In some examples, a bandwidth of the control resource set is equal to 20 PRBs.

In some examples, the bandwidth of the control resource set is smaller than 20 PRB s.

In some examples, the bandwidth of the control resource set is 18 PRBs.

In some examples, the first determination module 220 is configured to: when the bandwidth of the SSB is smaller than 20 PRBs, determine the resources of the control resource set according to the configuration information of the control resource set of the first type of UE.

An example of the present application further provides a communication device, including: a transceiver, a memory, a processor and a computer program stored on the memory and executed by the processor; and the processor is respectively connected with the transceiver and the memory and configured to implement any one of the resource configuration method or the resource determination method provided by the any above-mentioned technical solution when executing the computer program.

The transceiver may include: various types of antennas, e.g., mobile antennas such as a 3G antenna, a 4G antenna or a 5G antenna and the like; and the antennas also may include: a WiFi antenna or a wireless charging antenna and the like.

The memory may include various types of storage mediums, and the storage medium is a non-transitory computer storage medium, and can continue to memory information stored on it after the communication device is powered off.

The processor may be connected with the antenna and the memory through a bus and the like, and is configured for reading an executable program stored on the memory to implement any one of the resource configuration method or the resource determination method provided by the any above-mentioned technical solution, e.g., at least one of the methods as shown in FIG. 2, FIG. 3 and/or FIG. 4.

An example of the present application further provides a non-transitory computer readable storage medium. The non-transitory computer readable storage medium stores an executable program which implements the steps of any one of the resource configuration method or the resource determination method provided by the any above-mentioned technical solution, e.g., at least one of the methods as shown in FIG. 2, FIG. 3 and/or FIG. 4, when being executed by the processor.

When the communication device is a base station, the communication device can execute any one example of the resource configuration method applied to the base station.

When the communication device is UE, the communication device can execute any one example of the resource determination method applied to the terminal.

An example of the present application provides a computer storage medium. The computer storage medium stores a computer program. After the computer program is executed, any one of the resource configuration method or the resource determination method provided by the any above-mentioned technical solution is implemented.

Several specific examples will be provided below in combination of any of the above-mentioned examples:

Example 1 this example provides a resource configuration method, and the configuration method may include:

a bandwidth of an SSB is configured to be smaller than or equal to a current bandwidth of 20 PBRs. In the equal solution, the existing bandwidth of the SSB is not changed, and in the smaller solution, the bandwidth of the SSB needs to be changed.

In some cases, for the SSB of which the bandwidth is smaller than 20 PRBs, a sync raster of the SSB should be reset so as to be distinguished from a sync raster of a legacy SSB.

For definition of a CORESET #0, the bandwidth is modified not to be greater than the bandwidth of the SSB, only TDM is carried out, and no Frequency Division Multiplexing (FDM) is carried out, a configuration table of the CORESET #0 can improve flexibility of TDM.

Example 2 a modified table in the solution is as follows, and in other words, when a bandwidth of an SSB is X PRBs, a bandwidth of a CORESET #0 is also X PRBs, a corresponding number of symbols is Y, and X*Y=48; and the number of symbols also may be greater than Y and smaller than 14. For example, Y may be 7; for another example, one time slot may include: (Y+K) symbols, but (Y+K) needs 14. The SSB and the CORESET #0 are the same in bandwidth, so an RBs offset is always equal to 0; and for example, it can refer to Table 3.

Example 3

If a bandwidth of an SSB is not changed and a second type of UE still can search the bandwidth, the bandwidth of the SSB is not changed and is still 20 PRBs; and configuration of a CORESET #0 is as shown in the table above. It is just that there may be few system configuration values, for example, only Index0 is configured, and for example, it can refer to the above-mentioned Table 2.

It needs to be modified that redundant information (e.g., a reserved bit of a Kssb field) in a PBCH is utilized to indicate that this bandwidth is configured to a narrow band UE only (i.e., after wide band UE sees and considers that it is an SSB, if there is no RMSI, the wide band UE will go to search other SSBs according to an existing protocol).

The configuration of 4 bits of the Kssb field in the PBCH message is adopted, and because PRB offset=0 and the bandwidth configuration selects that a threshold of the bandwidth is also limited and equal to the bandwidth of the SSB, the number of actually used bits is smaller than 4, and actually one bit is enough. Therefore, after the RMSI indicates that the Kssb field in the table is occupied, due to only TDM and no BUM (for the narrow band), the table of the CORESET #0 is modified to be as shown in Table 1 so as to support the narrow band UE. However, there is a certain limitation to the Kssb field, i.e., the original Kssb field adopts 4 bits to represent 11 possibilities (1 to 11 RE-level offsets), and thus, 3 bits may represent 8 RE-level offsets, and 2 bits represent 4 RE offsets. For example, for selection of the offset, if there are four offsets, the offsets may be 0, 3, 7 and 11, and if there are 8 offsets, it only needs to exclude three offsets, so that flexibility is reduced a little, and for example with reference to Table 1.

Figure 7:
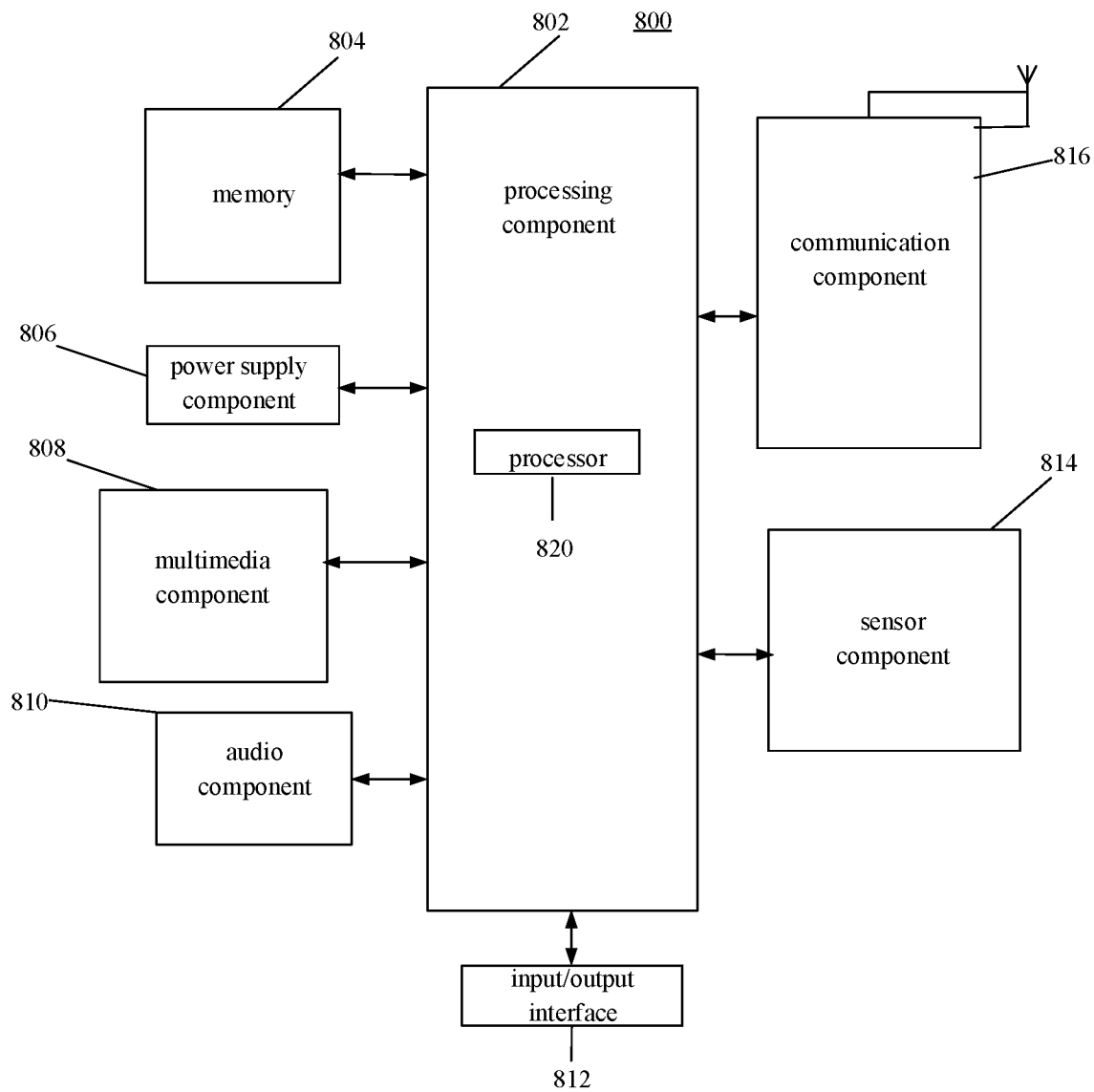
FIG. 7 is a structural schematic diagram of a terminal provided by an example of the present application.

FIG. 7 shows a terminal according to an example. For example, the terminal may be a mobile phone, a computer, a digital broadcast terminal, a message transceiving device, a game console, a tablet device, a medical device, a fitness device, a personal digital assistant and the like.

With reference to FIG. 7, an apparatus 800 may include one or more of the following components: a processing component 802, a memory 804, a power supply component 806, a multimedia component 808, an audio component 810, an Input/Output (I/O) interface 812, a sensor component 814, and a communication component 816.

The processing component 802 generally controls the overall operations of the apparatus 800, such as operations associated with display, a telephone call, data communication, a camera operation and a recording operation. The processing component 802 may include one or more processors 820 for executing instructions so as to complete all or part of the steps of the above-mentioned methods. In addition, the processing component 802 may include one or more modules so as to facilitate interaction between the processing component 802 and other components. For example, the processing component 802 may include a multimedia module so as to facilitate interaction between the multimedia component 808 and the processing component 802.

The memory 804 is configured to store various types of data to support the operations of the apparatus 800. Examples of the data include instructions of any application or method, contact data, telephone directory data, messages, pictures, videos and the like for being operated on the apparatus 800. The memory 804 may be implemented by a random type of volatile or nonvolatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disc.

The power supply component 806 provides power to various components of the apparatus 800. The power supply component 806 may include a power supply management system, one or more power supplies, and other components associated with power generation, management and distribution for the apparatus 800.

The multimedia component 808 includes a screen positioned between the apparatus 800 and a user and providing an output interface. In some examples, the screen may include a Liquid Crystal Display (LCD) and a Touch Panel (TP). If the screen includes the touch panel, the screen may be implemented as a touch screen for receiving an input signal from the user. The touch panel includes one or more touch sensors for sensing touch, sliding and gestures on the touch panel. The touch sensor can not only sense a boundary of the touch or sliding action, but also detect the duration and the pressure related to the touch or sliding operation. In some examples, the multimedia component 808 includes one front camera and/or rear camera. When the apparatus 800 is in an operating mode, such as a shooting mode or a video mode, the front camera and/or the rear camera can receive external multimedia data. Each front camera and rear camera may be a fixed optical lens system or have a focal length and an optical zooming ability.

The audio component 810 is configured to output and/or input an audio signal. For example, the audio component 810 includes a microphone (MIC), and when the apparatus 800 is in an operating mode, such as a calling mode, a recording mode and a voice recognizing mode, the microphone is configured to receive an external audio signal. The received audio signal may be further stored in the memory 804 or transmitted via the communication component 816. In some examples, the audio component 810 further includes a loudspeaker for outputting the audio signal.

The I/O interface 812 provides an interface between the processing component 802 and a peripheral interface module, and the peripheral interface module may be a keyboard, a click wheel, a button and the like. These buttons may include, but be not limited to: a homepage button, a volume button, a start button and a lock button.

The sensor component 814 includes one or more sensors for providing state evaluation of each aspect for the apparatus 800. For example, the sensor component 814 may detect an on/off state of the apparatus 800 and relative positioning of the components, for example, the components are a display and a small keyboard of the apparatus 800, and the sensor component 814 also may detect a position change of the apparatus 800 or one component of the apparatus 800, existence or nonexistence of contact between the user and the apparatus 800, the orientation or acceleration/deceleration of the apparatus and a temperature change of the apparatus 800. The sensor component 814 may include a proximity sensor configured to detect existence of objects nearby when there is no any physical contact. The sensor component 814 also may include an optical sensor, such as a Complementary Metal Oxide Semiconductor (CMOS) or Charge Coupled Device (CCD) image sensor, for use in the imaging application. In some examples, the sensor component 814 also may include an acceleration sensor, a gyroscope sensor, a magnetic sensor, a pressure sensor or a temperature sensor.

The communication component 816 is configured to facilitate communication between the apparatus 800 and other devices in a wired or wireless mode. The apparatus 800 may access a wireless network based on the communication standard, such as Wi-Fi, 2G or 3G, or a combination thereof. In one example, the communication component 816 receives a broadcast signal or broadcast related information from an external broadcast management system via a broadcast channel In one example, the communication component 816 further includes a Near Field Communication (NFC) module for promoting short range communication. For example, the NFC module may be implemented based on a Radio Frequency Identification (RFID) technology, an Infrared Data Association (IrDA) technology, an Ultra Wide Band (UWB) technology, a Blue Tooth (BT) technology and other technologies.

In an example, the apparatus 800 may be implemented by one or more Application Specific Integrated Circuits (ASICs), Digital Signal Processors (DSPs), Digital Signal Processing Devices (DSPD), Programmable Logic Devices (PLD), FPGAs, controllers, microcontrollers, microprocessors or other electronic components, and used for executing the above-mentioned methods.

In an example, further provided is a non-transitory computer readable storage medium including an instruction, e.g., the memory 804 including the instruction. The instruction may be executed by the processor 820 of the apparatus 800 to complete the above-mentioned methods. For example, the non-transitory computer readable storage medium may be an ROM, a Random Access Memory (RAM), a Compact Disc Read-Only Memory (CD-ROM), a magnetic tape, a soft disk and an optical data storage device and the like.

Figure 8:
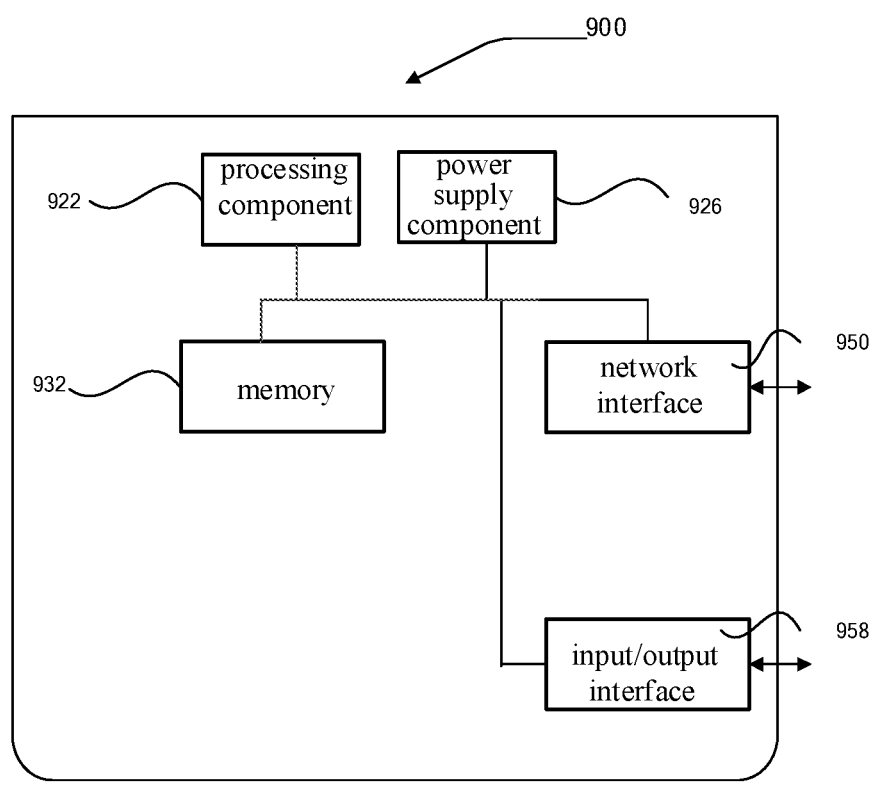
FIG. 8 is a structural schematic diagram of a base station provided by an example of the present application.

FIG. 8 is a schematic diagram of a base station. With reference to FIG. 8, an apparatus 900 includes a processing component 922, and further includes one or more processors and a memory resource represented by a memory 932 and used for storing an instruction, such as an application, capable of being executed by the processing component 922. The application stored in the memory 932 may include one or more modules each of which corresponds to one group of instructions. In addition, the processing component 922 is configured to execute the instructions.

The base station 900 further may include a power supply component 926 configured to execute power supply management of the apparatus 900, a wired or wireless network interface 950 configured to connect the apparatus 900 to a network, and an I/O interface 958. The apparatus 900 can operate an operation system stored in the memory 932, e.g., Windows Server™, Mac OS X™, Unix™, Linux™, FreeBSD™ or similar systems.

The controller, the microcontroller, the microprocessor or other electronic components are implemented for executing the above-mentioned methods.

In an example, further provided is a non-transitory computer readable storage medium including an instruction, e.g., a memory 932 including the instruction. The instruction may be executed by a processor of an apparatus 900 to complete the above-mentioned methods. For example, the non-transitory computer readable storage medium may be an ROM, an RAM, a CD-ROM, a magnetic tape, a soft disk and an optical data storage device and the like.

Those skilled in the art could easily think of other implementation solutions of the examples of the present application after considering the specification and practicing the present disclosure disclosed herein. The present application aims to cover any modification, application or adaptive change made to the examples of the present application, and those modifications, applications or adaptive changes follow the general principle of the examples of the present application and include common general knowledge or conventional technical means in the art undisclosed in the examples of the present disclosure. The specification and the examples are merely exemplary, the real scope and spirit of the examples of the present application are indicated by the claims below.

It should be understood that the examples of the present application are not limited to the accurate structures which have been described above and shown in the drawings, and various modifications and changes can be made without departure from the scope of the present disclosure. The scope of the examples of the present application is only defined by the appended claims.

The invention claimed is:

1. A resource configuration method, performed by a base station and comprising:
 sending a Synchronization Signal and PBCH block (SSB) to a first type of User Equipment (UE), wherein a Physical Broadcast Channel (PBCH) message in the SSB carries a Kssb field, a bandwidth supported by the first type of UE is smaller than that supported by a second type of UE, and bandwidths of the SSB configured to the first type of UE and the second type of UE are both 20 Physical Resource Blocks (PRBs); and
 configuring resources of a control resource set of the first type of UE, wherein resource configuration information of the control resource set of the first type of UE comprises a resource configuration indication at a Resource Block (RB) level of the control resource set.

2. The resource configuration method according to claim 1, further comprising:
indicating the SSB to be configured to the first type of UE by utilizing a reserved bit of the Kssb field.

3. The resource configuration method according to claim 2, wherein resource configuration information of the control resource set of the first type of UE further comprises an offset, wherein the offset is used for indicating an offset quantity of Resource Element (RE) levels between a frequency domain resource in the control resource set and the SSB.

4. The resource configuration method according to claim 1, wherein when the SSB is configured to the first type of UE, a bandwidth of the control resource set is equal to or smaller than 20 PRBs.

5. The resource configuration method according to claim 4, wherein when the SSB is configured to the first type of UE, the bandwidth of the control resource set is a bandwidth of a random number of PRBs between 16 and 19;
and/or, the SSB of which the bandwidth is smaller than 20 PRBs has more time domain resources than the SSB of which the bandwidth is equal to 20 PRBs.

6. The resource configuration method according to claim 1, wherein the bandwidth of the SSB configured to the first type of UE is smaller than the bandwidth of 20 PRBs.

7. The resource configuration method according to claim 1, wherein at least two resources comprised by the control resource set are the same frequency domain resources adopting Time Division Multiplexing (TDM).

8. The resource configuration method according to claim 1, wherein configuring resources of the control resource set comprises:
configuring the bandwidth of the control resource set according to the bandwidth of the SSB transmitting a Primary Synchronization Signal (PSS) or a Secondary Synchronization Signal (SSS), wherein the bandwidth of the SSB transmitting the PSS is the same with that of the SSB transmitting the SSS.

9. A communication device, comprising: a transceiver, a memory, a processor and a computer program stored on the memory and executed by the processor, wherein the processor is respectively connected with the transceiver and the memory and configured to implement the resource configuration method according to claim 1 by executing the computer program.

10. A non-transitory computer storage medium, storing a computer program, wherein after the computer program is executed, the resource configuration method according to claim 1 is implemented.

11. A resource determination method, performed by a first type of User Equipment (UE) and comprising:
receiving a Synchronization Signal and PBCH block (SSB); and
determining a frequency domain resource at a Resource Block (RB) level of a control resource set according to resource indication information in configuration information of the control resource set of the first type of UE, wherein a Physical Broadcast Channel (PBCH) message in the SSB carries a Kssb field, a bandwidth supported by the first type of UE is smaller than that supported by a second type of UE, and bandwidths of the SSB configured to the first type of UE and the second type of UE are both 20 Physical Resource Blocks (PRBs).

12. The resource determination method according to claim 11, further comprising:
receiving the PBCH message; and
when a reserved bit of the Kssb field is carried in the PBCH message, determining that the SSB is configured to the first type of UE.

13. The resource determination method according to claim 12, further comprising:
determining an offset quantity of Resource Element (RE) levels between the SSB and a frequency domain resource in the control resource set according to an offset in configuration information of the control resource set of the first type of UE.

14. A non-transitory computer storage medium, storing a computer program, wherein after the computer program is executed, the resource determination method according to claim 11 is implemented.

15. A communication device, comprising: a transceiver, a memory, a processor and a computer program stored on the memory and executed by the processor, wherein the processor is respectively connected with the transceiver and the memory and configured to execute the computer program to:
receive a Synchronization Signal and PBCH block (SSB); and
determine a frequency domain resource at a Resource Block (RB) level of a control resource set according to resource indication information in configuration information of the control resource set of a first type of User Equipment (UE), wherein a Physical Broadcast Channel (PBCH) message in the SSB carries a Kssb field, a bandwidth supported by the first type of UE is smaller than that supported by a second type of UE, and bandwidths of the SSB configured to the first type of UE and the second type of UE are both 20 Physical Resource Blocks (PRBs).

* * * * *